A. & E. C. LINDELL.
NUT LOCK.
APPLICATION FILED JUNE 19, 1916.
1,203,755.
Patented Nov. 7, 1916.
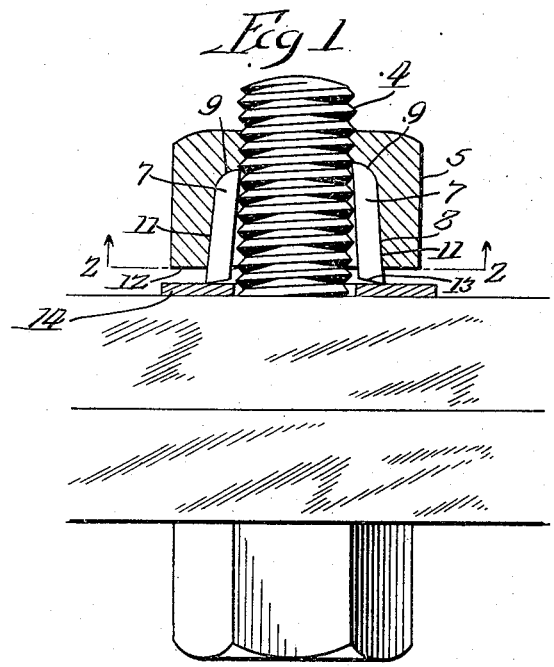
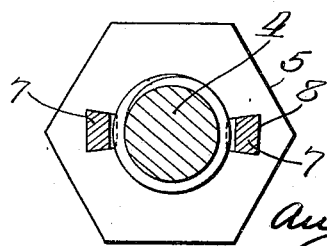
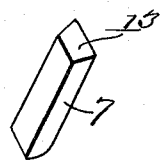
Inventors:
August Lindell
Elmer C. Lindell
By Pond & Wilson
Attys.

UNITED STATES PATENT OFFICE.

AUGUST LINDELL AND ELMER C. LINDELL, OF ROCKFORD, ILLINOIS.

NUT-LOCK.

1,203,755.

Specification of Letters Patent.

Patented Nov. 7, 1916.

Application filed June 19, 1916. Serial No. 104,511.

*To all whom it may concern:*

Be it known that we, AUGUST LINDELL and ELMER C. LINDELL, citizens of the United States, residing at Rockford, in the county of Winnebago and State of Illinois, have invented certain new and useful Improvements in Nut-Locks, of which the following is a specification.

This invention relates to improvements in nut locks, and designs, primarily, to provide a simplified and improved nut lock that will effectively serve the purpose for which it is intended.

To this end, our invention contemplates the provision of novel means coöperating between a nut and bolt in a manner to lock the two together upon drawing the nut down tight without marring or jamming the threads and preventing subsequent removal and usage of the nut and bolt. This locking means consists, preferably, of a pair of pins disposed in grooves in the nut extending crosswise of the threads and having inclined ends against which the tapered ends of the pins abut and by which these ends are adapted to be jammed in a peculiar manner into the bolt when the nut is drawn tight.

Referring to the drawings in which we have illustrated one practical embodiment of our invention; Figure 1 is a longitudinal sectional view through a nut lock embodying our improvements; Fig. 2 is a cross-sectional view taken on the line 2—2 of Fig. 1; and Fig. 3 is a detail view in perspective of one of the locking pins.

The bolt 4 and nut 5 may be of standard or conventional type adapted to be employed for clamping together various parts such as are apt to become loosened by jar and vibration to which they are subjected during usage. In the present instance, the parts to be clamped together are represented by two plates 6 through which the bolt passes.

Means for effecting the locking engagement between the nut and bolt consist of a pair of pins designated generally by reference character 7, which fit in grooves in the threaded face of the nut and are adapted to be forcibly jammed or pressed in a novel manner into engagement with but a small portion of the threaded face of the bolt to lock the nut to the bolt without marring or injuring to any appreciable extent the threads of the bolt. The grooves 8 in which the pins are disposed are formed in the threads of the nut on diametrically opposite sides of its bore and while this arrangement is preferable, it should be understood that either a single pin or any suitable plurality may be employed according to the size of the nut and to the circumstances. The grooves extend from one end of the nut and terminate short of the opposite end in curved faces 9 that lead into the bore. The inner walls 11 of the grooves are slightly inclined from the curved ends 9 to the open end of the grooves in a direction away from the bore so that the greatest depth of the grooves is at their open ends. In cross section the sides of the grooves converge slightly toward the bore as shown in Fig. 2. The pins 7 correspond in cross-sectional shape to the grooves and are also shaped at one end to conform to the curved ends 9 of the grooves. The pins are not, however, tapered lengthwise but have substantially parallel sides so that the pins may rock slightly on the curved faces 9 in a manner to move the major body of the pins away from the threaded face of the bolt and direct the pointed ends of the pins into the bolt, which movement is permitted by reason of the slight longitudinal taper of the grooves. The pins are of such length as to project beyond the end 12 of the nut and their projecting ends are tapered as at 13 parallel to the general plane of the taper of the opposite ends so as to provide diagonally opposite pointed ends. A washer 14 may be interposed between the nut and the adjacent part to be clamped so that the ends of the pins will not mar said part.

Before the nut is moved into engagement with the parts to be clamped the pins are retained against displacement from the nut by frictional engagement with the tapered sides of the grooves. Upon turning the nut down tight on the bolt the pins will be forced lengthwise in the grooves and, due to the peculiar shape thereof, the pins will be rocked slightly outwardly on the curved faces 9 so that the major body of the pins are prevented from marring the threads of the bolt. By this action, however, the inner pointed ends of the pins are directed into the bolt and as the nut is turned home, the said ends are forcibly jammed into the bolt. These ends will engage in a tooth and will not mar the same. It will be noted that due to the peculiar shape of the ends of the pins the force applied thereto will be in a line directly between the points of said ends so as to move the pins lengthwise and laterally in the manner desired, that is, so that substantially only the points of the pins impinge the bolt. The pins thus engaged will effectively lock the nut to the bolt, and it will be apparent that the locking action in no way impairs the nut and bolt structure so that if it is desirable to subsequently remove the nut and bolt this may be easily done, leaving the nut and bolt in condition for use numerous times thereafter.

We claim:

1. An improved nut lock comprising a bolt, a nut therefor having a groove in its threaded face extending from one end of the nut crosswise of the threads and terminating short of the opposite end, the inner end of the groove being inclined providing an inclined abutment leading into the bore of the nut, and a pin adapted to slidably fit in said groove, the pin being of greater length than said groove and having an end in abutment with said inclined end of the groove and tapered substantially in conformity to the same, whereby when the nut is drawn tight the pin will be forced lengthwise and the tapered point thereof will be directed laterally by the inclined abutment and jammed into the adjacent threaded face of the bolt to effectively lock the nut thereto.

2. An improved nut lock comprising a bolt, a nut therefor having an axial groove in its threaded face extending from one end partially to the other end of the nut, the inner face of the groove being slightly inclined toward the bore from the open end of the nut toward its closed end, which latter is inclined at a more pronounced angle into the bore of the nut, and a pin fitting in the groove, having substantially parallel sides and a tapered end abutting against said inclined end of the groove, the other end of said pin projecting beyond the adjacent face of the nut, whereby when the nut is drawn tight the pin will be forced lengthwise and its tapered end guided by the inclined faces of the groove so that the major length of the pin is moved away from the bolt and the said tapered end is forcibly jammed into the bolt.

3. An improved nut lock comprising a bolt, a nut therefor having a groove in its threaded face extending from one end of the nut part way the length thereof having sides shaped in cross section to converge toward the bore of the nut and having its inner end inclined into the bore, and a pin fitting in said groove, shaped to conform to the sides and inclined end thereof so that the pin is prevented from moving radially into the bore of the nut, the outer end of the pin being projected beyond the adjacent end of the nut so that when the same is drawn tight the pin will be moved lengthwise in the groove and the pointed end of the pin will be jammed into the adjacent threaded face of the bolt by the action of said inclined end of the groove.

4. An improved nut lock comprising a bolt, a nut therefor, the threaded face of which is grooved throughout a portion of its length, the inner end of the groove being curved into the bore and the inner wall extending from said curved end to the open end of the groove on a slight incline away from the bore so that the depth of the groove is greatest at its open end, and a pin fitting in said groove, having substantially parallel sides and being curved at one end in conformity to the said curved end of the groove and tapered at its opposite end so as to present diagonally opposite pointed ends, the said tapered end projecting beyond the adjacent end of the nut when the pin is in abutment with said curved end of the groove, whereby when the nut is drawn tight the pin will be forcibly pressed lengthwise in a line between the said diagonally opposite ends of the points of the pin so that the pin will be rocked outwardly on said curved end of the groove, thus preventing the major body of the pin from marring the threads of the bolt and causing the inner pointed end of the pin to be jammed into the bore to effectively lock the nut thereto.

AUGUST LINDELL.
ELMER C. LINDELL.

Copies of this patent may be obtained for five cents each, by addressing the "Commissioner of Patents, Washington, D. C."